United States Patent [19]

Yamagishi et al.

[11] Patent Number: 4,810,046
[45] Date of Patent: Mar. 7, 1989

[54] LIGHT BEAM SCANNING APPARATUS

[75] Inventors: Fumio Yamagishi, Ebina; Shinya Hasegawa, Machida; Hiroyuki Ikeda, Yokohama; Takefumi Inagaki, Kawasaki, all of Japan

[73] Assignee: Fujitsu Limited, Kawasaki, Japan

[21] Appl. No.: 120,727

[22] Filed: Nov. 16, 1987

Related U.S. Application Data

[63] Continuation of Ser. No. 624,950, Jun. 26, 1984, abandoned.

[30] Foreign Application Priority Data

Jun. 30, 1983 [JP] Japan ................................ 58-119098

[51] Int. Cl.$^4$ ............................................. G02B 26/10
[52] U.S. Cl. ..................................................... 350/371
[58] Field of Search ........................................ 350/3.71

[56] References Cited

U.S. PATENT DOCUMENTS

| 4,094,576 | 6/1978 | Heiling | 350/3.71 |
| 4,148,549 | 4/1979 | Termanis | 350/3.7 |
| 4,289,371 | 9/1981 | Kramer | 350/3.71 |
| 4,428,643 | 1/1984 | Kay | 350/3.71 |

FOREIGN PATENT DOCUMENTS

| 57-34517 | 2/1982 | Japan | 350/3.71 |
| 58-58518 | 4/1983 | Japan | 350/3.71 |

Primary Examiner—Bruce Y. Arnold
Attorney, Agent, or Firm—Staas & Halsey

[57] ABSTRACT

In a light beam scanning apparatus using a hologram rotator, a post-hologram is provided for further diffracting a light beam diffracted by the hologram rotator to a direction opposite to that of the direction in which the light beam is diffracted by the hologram rotator. By combining the kinds of wave fronts used for forming the holograms of the holograms rotator and the post-hologram, the light beam scanning apparatus reduces the deviation of the light beam scanning position caused by the mode hopping of a laser diode, and an improved linear scanning of the light beam and/or image focusing characteristic is obtained.

12 Claims, 12 Drawing Sheets

LIGHT BEAM SCANNING APPARATUS

This is a continuation of co-pending application Ser. No. 624,950, filed on June 26, 1984 now abandoned.

BACKGROUND OF THE INVENTION

The present invention relates to a light beam scanning apparatus using a hologram rotator, particularly to a light beam scanning apparatus wherein the deviation of the scanning position of the scanning beam due to the mode hopping of the laser diode as a light source is corrected, whereby an improved linear scanning and a high focusing degree of the light beam can be attained.

Recent research and development has enhanced the operations of a laser printer using holography, in which the laser printer produces an image by scanning the laser light beam on the scanning plane through a polygon mirror and lens system. Other developments include low cost light beam scanning apparatuses using a hologram scanner provided with a hologram disk instead of the polygon mirror and lens system. Laser printers including the hologram scanner have fewer problems when utilizing a gas, e.g., He-Ne, laser or the like, than, for example, those using a laser diode, wherein the deviation of the scanning position of the light beam occurs due to mode hopping of the laser diode. Thereby, an apparatus using a hologram scanner is prevented from obtaining a satisfactory performance. Also, the linearity of the scanning beam (uniform velocity characteristic of the scanning beam with respect to the uniform angular velocity of the hologram disk), and the image focusing characteristics of the scanning beam without optical lenses, are not completely satisfactory.

SUMMARY OF THE INVENTION

An object of the present invention is to provide a light beam scanning apparatus wherein the deviation of the scanning position of the light beam due to the mode hopping of the light source does not occur, and improved linear scanning and image focusing characteristics of the scanning beam are obtained, by providing, at a stage subsequent to the hologram rotator a post-hologram which corrects for the effect of the mode hopping of the light source, and thereby improves the linear scanning function and the high focusing image of the light beam on the scanning plane.

According to the present invention, there is provided a light beam scanning apparatus using a hologram rotator, said apparatus comprising a post-hologram including a spatial frequency for further diffracting a light beam diffracted by the hologram rotator to a direction opposite to that of the direction to which the light beam is diffracted by the hologram rotator.

DESCRIPTION OF THE PREFERRED EMBODIMENTS

Prior to the description of the preferred embodiments, for a clearer understanding, it is necessary that the prior art apparatus be explained with reference to FIGS. 1 and 2.

Figure 1:
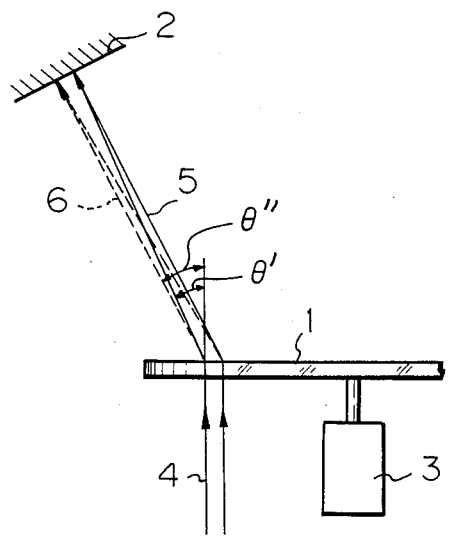
FIG. 1 shows a diagram of a light path in a conventional laser printer using a hologram scanner.

A prior art laser printer using a hologram scanner is shown in FIG. 1. In FIG. 1, a light beam 4 is radiated onto a hologram disk which is rotated continuously by a motor 3, and the beam is diffracted to become a diffracted beam 5 having the diffraction angle $\theta'$, as a result of the hologram interference fringes, which is converged on a scanning plane 2. When a laser diode is used as a light source of the light beam 4, the wavelength of the light beam 4 changes whenever there are fluctuations in the temperature. For example, when there are deviations in the wavelength, i.e., the wavelength becomes longer, the diffraction angle becomes larger and the diffracted beam 6 having the diffraction angle $\theta''$ (shown by a broken line) is obtained. Therefore, a defect occurs in which there is a deviation in the converging position of the light beam. Also, the scanning velocity of the diffracted light beam 6 on the scanning plane 2 to the uniform angular velocity of the motor 3 is not uniform. Therefore, the scanning linearity is not satisfactory. Further, the image formation characteristic (focusing of the light beam) is not always satisfactory.

Figure 2:
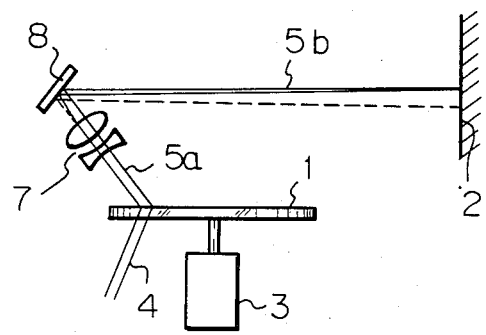
FIG. 2 shows a diagram of a light path in another conventional laser printer using a hologram scanner.

FIG. 2 shows another prior art apparatus using a hologram scanner wherein the diffracted light beam 5a passes through an f.θ lens 7 to obtain a satisfactory scanning linearity. In FIG. 2, a light beam 4 is radiated onto a hologram disk 1 rotated by a motor 3 and is diffracted through hologram interference fringes to become a diffracted light beam 5a. The diffracted light beam 5a then passes through the f.θ lens 7, is reflected by a mirror 8, and converges on a scanning plane 2. The apparatus in FIG. 2 has a better scanning linearity of a light beam 5b than that shown in FIG. 1. However, there is still a defect in that, when the laser diode is used as a light source, the waelength of the light beam 4 fluctuates. For example, if the wavelength becomes longer, the diffraction angle becomes larger, the diffracted light becomes as shown by the broken line and is reflected by the mirror 8, and the scanning position of the light beam changes on the scanning plane. In addition, since use of the f.θ lens 7 is very costly, the production cost of the apparatus is expensive.

Other prior art involves the apparatus disclosed in Japanese Unexamined Patent Publication (Kokai) No. 57-181523 (the priority benefit of which is claimed in U.S. Application Ser. No. 252,508). In this apparatus a fixedly located hologram (corresponding to the post-hologram in the present invention) is arranged at a stage preceding the hologram rotator.

In the following description, various embodiments of the present invention are explained in detail with reference to the drawings.

Figure 3:
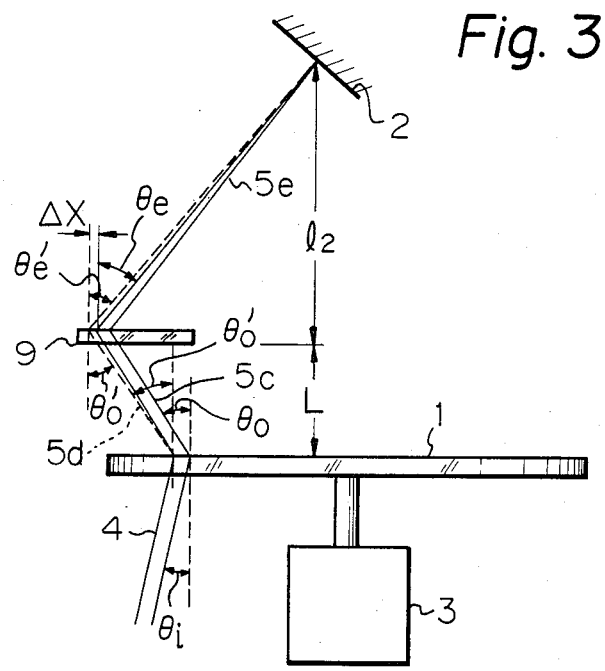
FIG. 3 shows a diagram of a light path of a light beam scanning apparatus according to a first embodiment of the present invention.

FIG. 3 shows light beam paths of a light beam scanning apparatus according to a first embodiment of the present invention. The reference numerals used in FIG. 3 are the same as those used in FIG. 1 and show the same elements, and accordingly repeated explanations are abbreviated.

In FIG. 3, a hologram disk 1 is rotated continuously by motor 3 and a coherent light beam 4, for example, a laser beam, is radiated onto the circular hologram disk 1. The radiated light beam 4 is diffracted through the interference fringes on the hologram disk 1 and applied to a fixedly located post-hologram 9, which is registered with a hologram by which the light beam is diffracted in the direction opposite that of the direction in which the light beam is diffracted by the hologram disk 1. The post-hologram 9 is parallel to the hologram disk 1 and at a predetermined distance therefrom. The light diffracted through the post-hologram 9 converges on the scanning plane 2.

The hologram which is registered on the hologram disk 1 converges and scans the light beam. The following description is of a case wherein a laser diode is used as a source of the light beam 4 that is radiated onto the hologram disk 1. Since the laser diode currently suffers from mode hopping due to changes in the temperature, the scanning position of the light beam is deviated. Therefore, the apparatus of the present invention provides the post-hologram 9 on which a hologram is registered so that the light beam is diffracted in the direction that is opposite to that of the direction in which the light beam is diffracted by the hologram disk 1. The light beam 4 from the laser diode is radiated onto to the continuously rotating hologram disk 1 at a predetermined angle $\theta$. The radiated light beam 4 becomes the diffracted light beam 5c that is diffracted at a diffraction angle of $\theta_0$ through the interference fringes on the hologram disk 1. If the wavelength of the light beam 4 is $\lambda$ and the spatial frequency of the hologram registered on the hologram disk 1 is f, the following equation is satisfied.

$$\sin \theta_0 = -\sin \theta_1 + f\lambda$$

If the wavelength of the light beam 4 from the laser diode changes by $\Delta\lambda$ due to change in the temperature, the term $f\lambda$ in the above equation becomes $f(\lambda+\Delta\lambda)$ and the angle is also changed. If the angle is assumed to be $\theta'_0$, the following equation is obtained.

$$\sin \theta'_0 = -\sin \theta_1 + f(\lambda+\Delta\lambda)$$

The correction of the diffraction angle corresponding to the wavelength deviation $\Delta\lambda$ of the light beam 4 is carried out by setting the diffraction directions of the post-hologram 9 and the hologram disk 1 in directions opposite to each other, so as to cancel the effect of $\Delta\lambda$.

The hologram is further registered to include information for scanning lineally on the scanning plane 2. The post-hologram 9 can be registered with a hologram to provide both the correction of the deviation of the scanning position due to the mode hopping and the linear scanning by eliminating the aberration of the diffracted light beam.

The correction of the deviation of the light beam converging position due to the mode hopping of the laser diode as a light source, which correction is performed through the post-hologram, is now explained.

When the light is projected to the hologram disk 1 having for instance a value fd or the spatial frequency f at incident angle $\theta_i$ and is diffracted at the angle of $\theta_0$, the following equation obtains.

$$\sin \theta_i + \sin \theta_0 = fd\lambda$$

When diffracted light is applied to the post-hologram 9 having for instance a value fp for the spatial frequency f and is diffracted at the angle of $\theta_e$ toward a reverse inclination, the following equation obtains.

$$\sin \theta_0 + \sin \theta_e = fp\lambda$$

When the wavelength of the incident light changes to $\lambda+\Delta\lambda$, the diffraction angle $\theta'_0$ from the hologram disk 1 satisfies the following equation.

$$\sin \theta_i + \sin \theta'_0 = fd(\lambda+\Delta\lambda)$$

The diffraction light is projected to a position on the post-hologram 9 deviated by distance $\Delta X$. At the post-hologram 9, the spatial frequency is $fp+(dfp/dx)\Delta X$ and the diffracted light from the post-hologram 9 satisfies the following equation.

$$\sin \theta'_0 + \sin \theta'_e = fp + (dfp/dx)\Delta X$$

To ensure that the diffracted light is in the same position on the scanning plane despite the change in its wavelength, it is necessary to establish the following relationship between the distance L from the hologram disk 1 to the post-hologram 9 and the distance $l_2$ from the post-hologram 9 to the scanning plane.

$$L(\tan \theta'_0 - \tan \theta_0) = l_2(\tan \theta'_e - \theta_e)$$

From the equations showing the above relationships, to ensure that the position of the light beam is not changed by the mode hopping, the relationship shown in the following equation is to be satisfied.

$$L(fd\Delta\lambda)/\cos^3\theta_0 = l_2\left\{(fp - fd)\Delta\lambda + \left(\frac{dfp}{dx}\right)\Delta X\right\}\cos^3\theta_e$$

As can be seen by the above equation, if the post-hologram 9 has respective values fp and (dfp/dx) X which satisfy the above equation for the predetermined values of L, fd, $\Delta\lambda$ and $\theta_0$, the deviation of the light beam position due to the mode hopping can be kept small.

The registering of the hologram to perform the linear scanning on the scanning plane is explained as follows.

Figure 4:
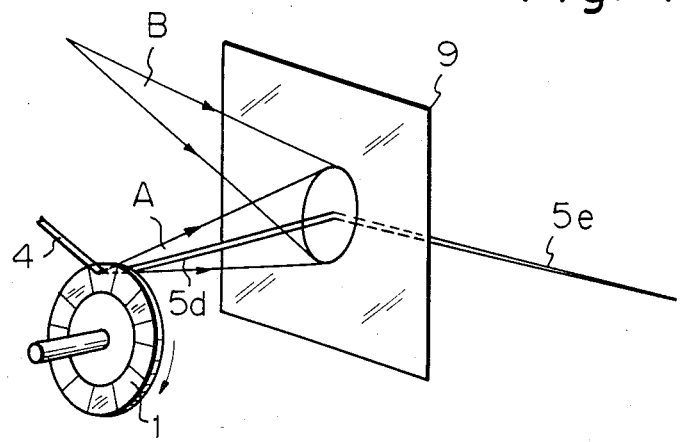
FIG. 4 shows a perspective view explaining a post-hologram shown in FIG. 3.
Figure 5:
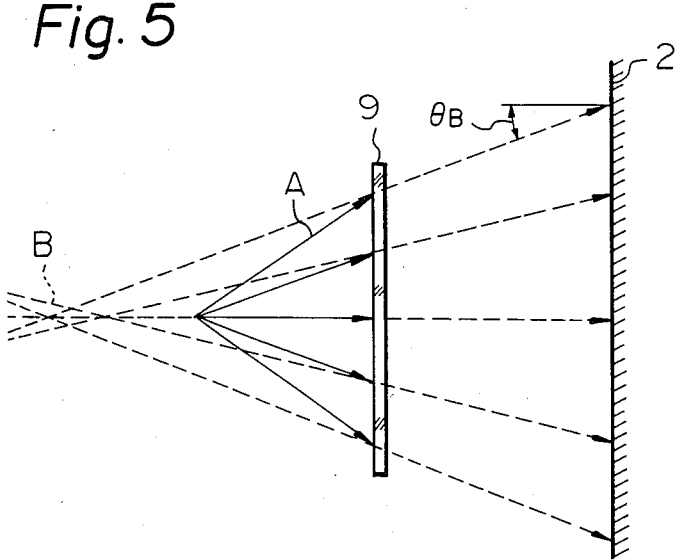
FIG. 5 shows a top view of the post-hologram shown in FIG. 3 explaining light paths therethrough.
Figure 6:
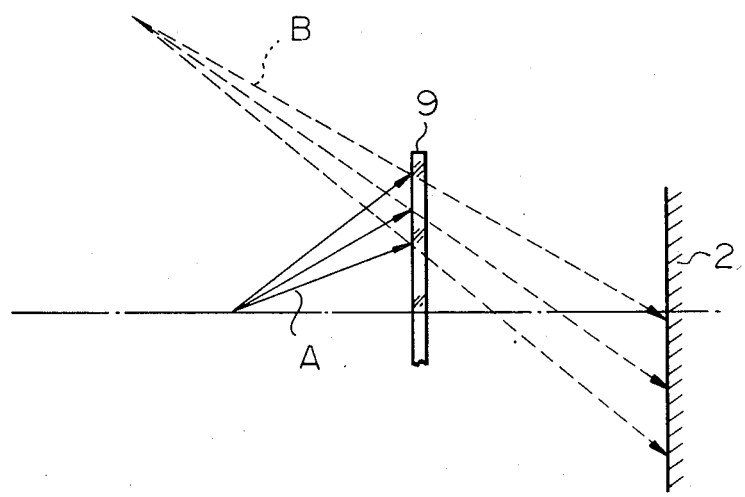
FIG. 6 shows a side view of the post-hologram shown in FIG. 3 explaining light paths therethrough.
Figure 7:
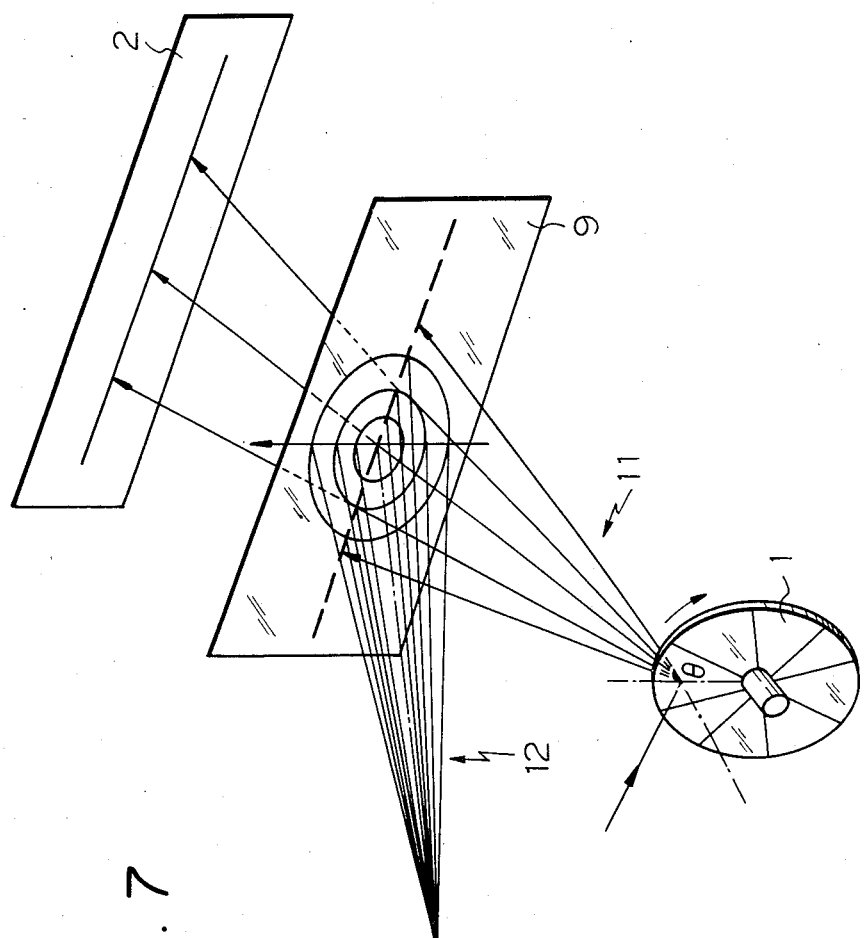
FIG. 7 shows a perspective view of an example of the relationship of the hologram disk, the post-hologram, and the scanning plane in the apparatus shown in FIG. 3.

In FIG. 4, the principle of the post-hologram used in the light beam scanning apparatus according to the present invention is illustrated. FIGS. 5 and 6 show a top view and a side view of the paths of the light beams, respectively.

In FIG. 4, the post-hologram 9 is registered by the interference of lights A and B. At least one or all of the lights A and B are spherical waves having a spherical aberration. As shown in FIG. 5, when the spherical wave A is radiated onto the post-hologram 9, the spherical wave B (shown in broken lines) is reconstructed. The linear scanning on the scanning plane 2 is performed if the following spherical wave B having an aberration is used for registering the post-hologram 9. Namely, when the post-hologram 9 is radiated by the spherical wave a, the wavefronts of the spherical wave B have a larger polarized angle toward the outer waves and a smaller polarized angle toward the inner waves, i.e., the angle $\theta_B$ between this wave and the normal axis of the scanning plane 2 gradually becomes larger toward the outside direction and gradually becomes smaller toward the inside direction. When the diffracted light 5d, corresponding to the light beam 4 being diffracted through the hologram disk 1 rotated in the direction shown by an arrow in FIG. 4, is radiated onto the post-hologram 9 registered by the lights having the wavefronts of the spherical waves A and B, the deviation of the scanning position of the diffracted light beam 5e due to the mode hopping is corrected by the post-hologram 9, and the diffracted light beam 5e with the added linear scanning characteristic is projected as a scanning beam.

FIG. 6 shows the side view of the wavefront of the spherical wave A and the wavefront of the spherical wave B having an aberration. If the hologram shown in FIGS. 5 or 6 is registered on the post-hologram 9, the linear scanning of the light beam (i.e., uniform scanning velocity with respect to angular velocity of the hologram disk) is performed. Moreover, as shown in FIG. 3, as a result of the cooperation of the hologram disk 1 and the post-hologram 9, wherein the incident light beam is diffracted oppositely by the hologram registered on the hologram disk 1 with a different spatial frequency from that of the post-hologram 9, the deviation of the diffraction angle due to the mode hopping is corrected and the light beam can be converted at a predetermined position on the scanning plane. If two light waves are used to form the hologram, many post-holograms 9 can be made, and thus the production cost of the apparatus is reduced.

An example of the particulars of post-holograms in the first embodiment is described in detail below with reference to FIGS. 7, 8, 9, 10, and 11.

Figure 8:
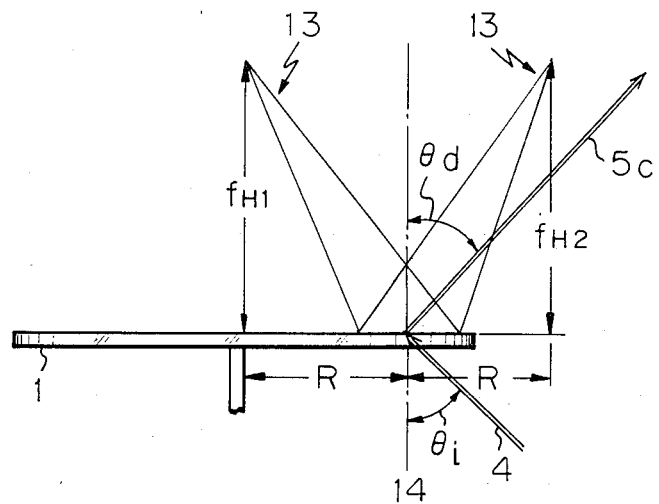
FIG. 8 shows a diagram of a light path of the hologram disk shown in FIG. 7.

The hologram disk is made with two spherical waves symmetric to each other, as shown in FIG. 8. The hologram-forming waves 13 are radiated onto the hologram disk 1 from a position symmetric with respect to the center 14 of the hologram.

The relationship between the rotation angle $\theta$ of the hologram disk 1 and the scanning width x of the post-hologram 9 is shown in equation (1).

$$x(\theta) = \frac{2LSR\sin\theta}{\sqrt{f_{H2}^2 + (1 - S^2)(5R^2 - 4R^2\cos\theta)}} \quad (1)$$

where L is the distance between the hologram disk 1 and the post-hologram 9, S is $\lambda_2/\lambda_1$, $\lambda_1$ is the hologram-forming wavelength, $\lambda_2$ is the reconstruction wavelength, R is the half value of the distance between two light sources for forming the hologram in the hologram disk 1, and $f_{H2}$ is the distance between the hologram disk 1 and one of the light sources.

To perform the linear scanning, the following relationship must be established.

$$x'/\theta = C \quad (2)$$

where, x' is the scanning width on the scanning plane 2, and C is a constant value. However, the following equation is obtained from the relationship in FIG. 9, $$x' = (l_1 + l_2)\tan\alpha = (l_1 + l_2)x/l_1$$

and therefore, $$\frac{(l_1 + l_2)x}{l_1\theta} = C. \quad (3)$$

Figure 9:
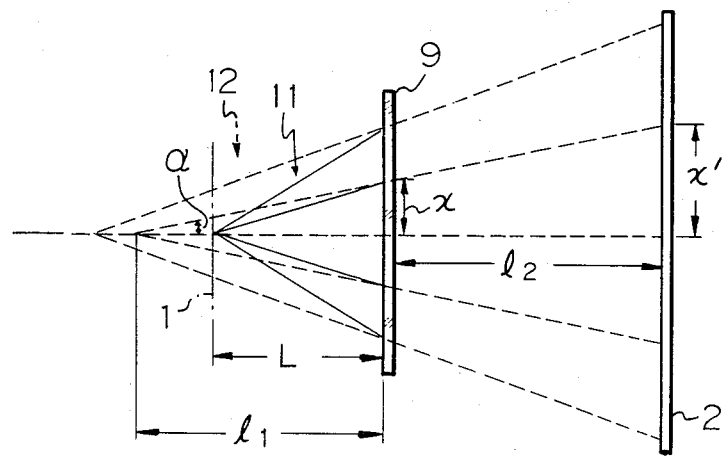
FIG. 9 is a top view showing light paths through the post-hologram shown in FIG. 7.

As shown in FIG. 9, "$l_1$" is the distance between a focus point of the objective wave and the post-hologram, and "$\alpha$" is the angle for viewing the scanning width x' from the focus point.

Figure 10:
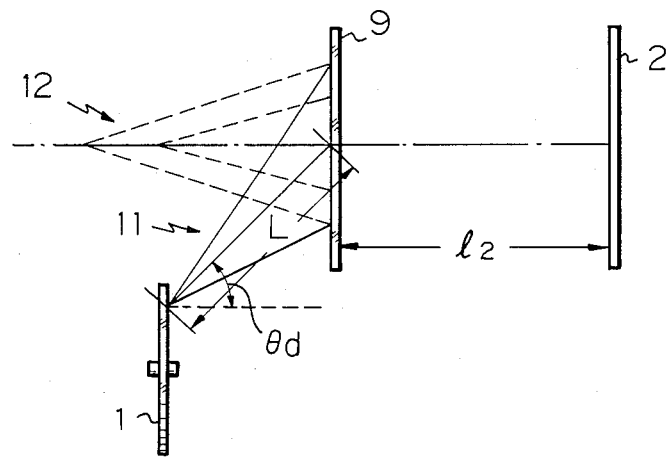
FIG. 10 is a side view showing light paths through the post-hologram shown in FIG. 7.
Figure 11:
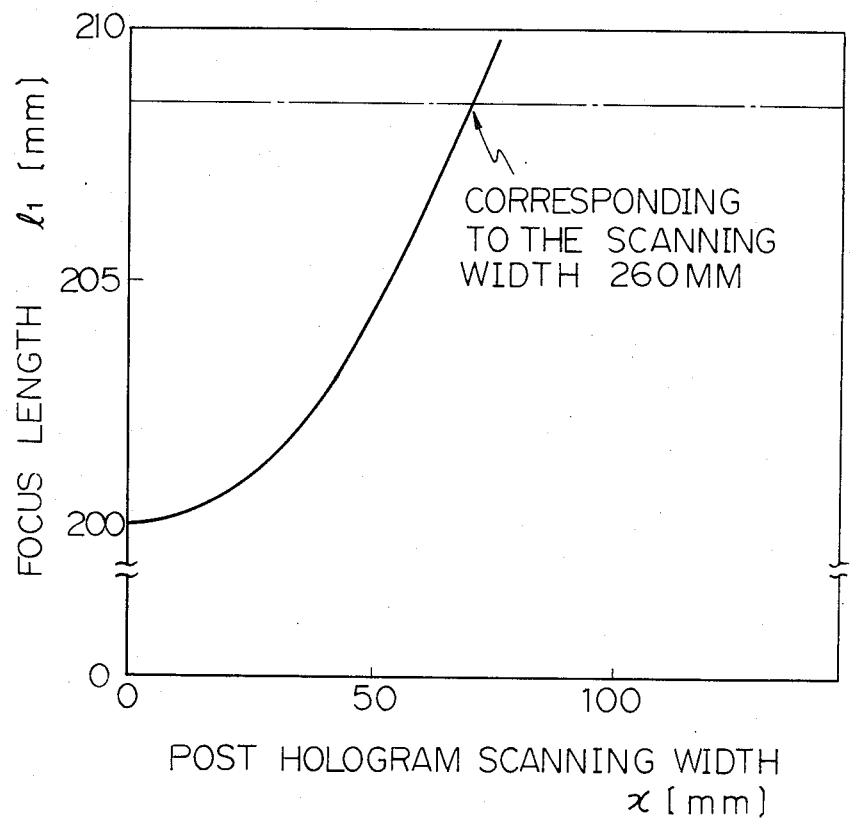
FIG. 11 is a graph showing a characteristic of a light wave for forming the post-hologram in the example shown in FIG. 7.

In FIG. 10, two waves 12 and 11, are illustrated for making the post-hologram 9. The wae 12, as shown in FIG. 11, is a spherical wave having an aberration for linear scanning. Where $l_1$ and x are as shown in FIG. 9, this wave haing an aberration can be generated according to the prior art for instance by using a lens. In equation (3), the constant value C is determined as follows. If $\theta \simeq 0$, from the equation (1), then $$x \simeq 2LSR\theta/\sqrt{f_{H2}^2 + (1 - S^2)R^2} \quad (4)$$

If equation (4) is substituted in the equation (3), then $$\frac{x'}{\theta} \simeq \frac{(l_1 + l_2) \times 2LSR}{l_1\sqrt{f_{H2}^2 + (1 - S^2)R^2}} \quad (5)$$

The mark $\simeq$ signifies approximately equal. When $\theta \simeq 0$, assuming $l_1 \simeq L$, then, $$C = (L + l_2) \times 2SR / \sqrt{f_{H2}^2 + (1 - S^2)R^2} \quad (6)$$

Generally
$$\frac{x'}{\theta} = \frac{(l_1 + l_2)x}{l_1\theta} =$$

$$\frac{(l_1 + l_2)x}{l_1} \cdot \frac{2LSR\sin\theta}{\theta\sqrt{f_{H2}^2 + (1 - S^2)(5R^2 - 4R^2\cos\theta)}}$$

The latter term is assumed as $$\frac{l_1 + l_2}{l_1} C_0 \quad (7)$$

Therefore, $$\frac{l_1 + l_2}{l_1} C_0 = C, \quad (8)$$

$$l_1 = \frac{l_2 C_0}{C - C_0} \quad (9)$$

If the post-hologram is made using the wave 12 (objective wave) satisfying the equation (9) and the divergent wave 11, the linear scanning is carried out.

Examples of the individual dimensions are as follows: $f_{H1} = f_{H2} = 180$ mm, $R = 60$ mm, $\lambda_1 = 325$ nm, $\lambda_2 = 760$ nm, $\theta_i \approx \theta_d = 45°$, $L = l_2 = 200$ mm, In the above condition, when the post-hologram is formed by one wave having the aberration as shown in FIG. 11 as an object wave 12 (wavelength 760 nm) and the other wave (wavelength 760 nm) as a reference wave 11, the complete linear scanning was carried out in the necessary scanning width of 260 mm. The aberration wave was realized with a lens.

For the above example, the result is described below for the case wherein when the wavelength of the reconstruction light source, i.e., the wavelength of 760 nm of the laser diode, is subjected to mode hopping, and wherein the deviation of the light beam position is decreased.

Mode hopping in the laser diode usually effects a deviation of ±0.3 nm in the wavelength thereof. The deviation of the wavelength causes a position change of ±495 μm perpendicular to the scanning direction without the post-hologram. This results in a deterioration of the printing quality. On the other hand, where the post-hologram is used, the post-hologram diffracts the light beam in the direction opposite to that of the direction in which the light beam is diffracted by the hologram disk 1, whereby the deviation of scanning position toward the perpendicular of the scanning direction considerably decreases, i.e., within ±56 μm.

Where a simple plane grating is used (for example, as shown in Japanese Unexamined Patent Publication No. 55-161211) as a hologram disk 1, the $x(\theta)$ in equation (1) may be substituted for the following equation (1)'.

$$x(\theta) = \frac{L\sin\theta_i\sin\theta}{\sqrt{1 - \sin^2\theta_i - (f\lambda_2)^2 + 2\sin\theta_i f\lambda_2\cos\theta}} \quad (1)'$$

In this condition, the line scanning is performed. In the equation, f is the spatial frequency.

A light beam scanning apparatus according to a second embodiment of the present invention is explained with reference to FIGS. 12 to 16.

Figure 12:
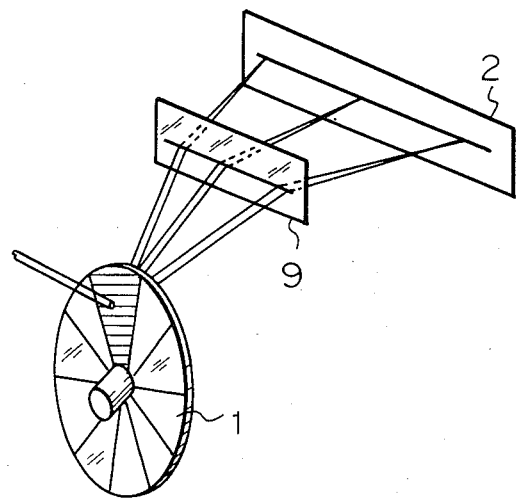
FIG. 12 shows a perspective view of a light beam scanning apparaus according to a second embodiment of the present invention.
Figure 13:
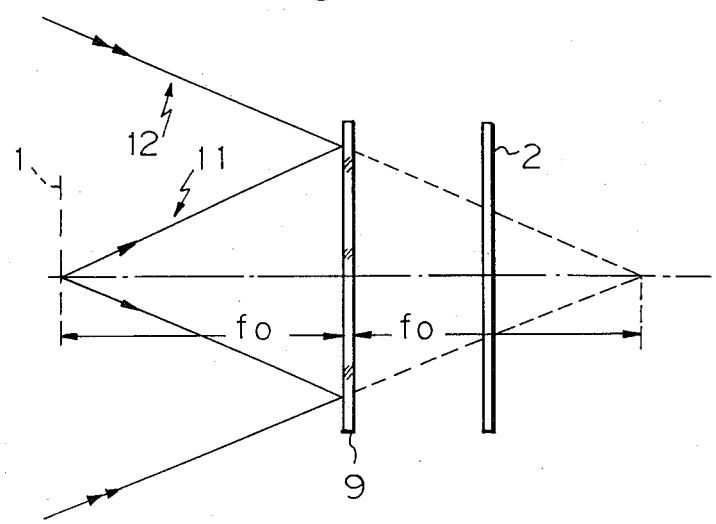
FIG. 13 is a top view showing light paths through the post-hologram shown in FIG. 12.
Figure 14:
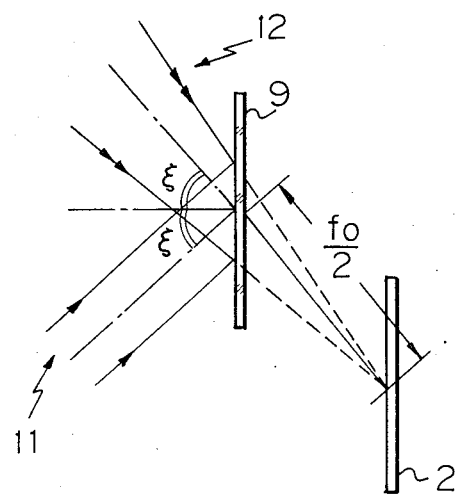
FIG. 14 is a side view showing light paths through the post-hologram shown in FIG. 12.
Figure 15:
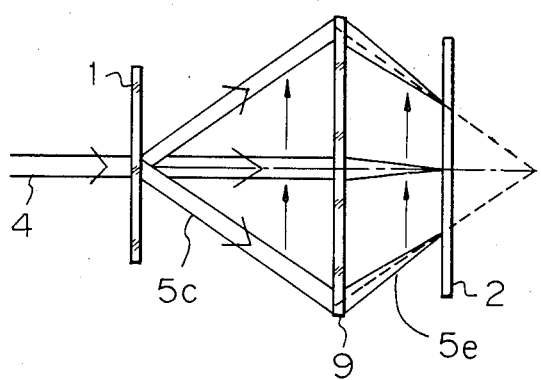
FIG. 15 is a top view showing the light paths in the apparatus shown in FIG. 12.
Figure 16:
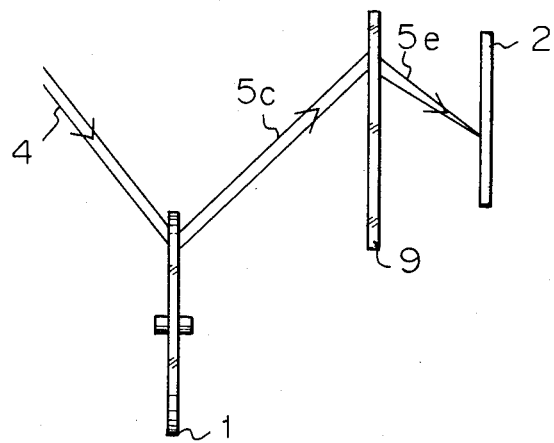
FIG. 16 is a side view showing the light paths in the apparatus shown in FIG. 12.
Figure 17:
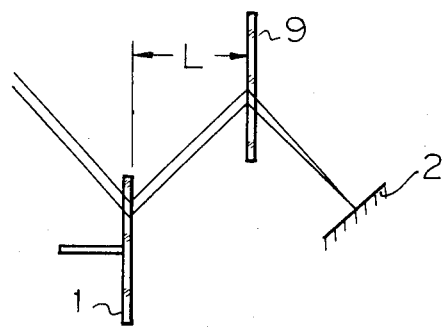
FIG. 17 is a diagram of a light path in a light beam scanning apparatus according to a third embodiment of the present invention.

FIG. 12 shows a schematic perspective view diagram of the apparatus. FIGS. 15 and 16 respectively show the top and side views of the apparatus of FIG. 12. The simple plane grating is used for the hologram of the hologram disk 1. The apparatus provides the image focusing characteristics. The forming method for the post-hologram 9 having image focusing characteristics is shown in FIGS. 13 and 14. In FIG. 13, showing the top view, the forming of the post-hologram 9 is performed by a divergent spherical wave and a convergent spherical wave having the same focal length $f_0$. On the other hand, in FIG. 14, showing the side view, the forming is performed by the convergent sperical wave as an object wave 12 having a focal length $f_0/2$ and the plane wave as a reference wave 11. The wave having an astigmatic difference as shown in the above example is obtained by using a cylindrical lens or the like.

The details of this embodiment are as follows.

In the hologram disk,

| In the hologram disk, | |
|---|---|
| Spatial frequency: | f = 1855.2 lines/mm |
| Reconstruction wavelength: | 760 nm |
| | (laser diode) |
| Incident angle and diffraction angle: | $\theta_i \approx \theta_d \approx 45°$ |
| Reconstruction wave and diffraction wave: | plane wave |
| In the post-hologram, | |
| Focal length: | $f_0$ = 600 mm |
| Incident angle | $\xi = 45°$ |
| Hologram forming wavelength: | 760 nm |
| | (laser diode) |

In the above arrangement, within the necessary scanning width of 130 mm on the scanning plane, the image focusing characteristics are of a high quality. When the deviation of the scanning line by the mode hopping is ±0.3 nm, a deviation of ±900 μm occurs on the post-hologram. However, by using the post-hologram, the deviation on the scanning plane decreases to within ±2 μm.

A light beam scanning apparatus according to a third embodiment of the present invention is explained with reference to FIGS. 17 to 22. In this embodiment, the reducing of the deviation of the scanning position due to the mode hopping, the linear scanning, and the satisfactory image focusing characteristics can be realized by using a hologram rotator projecting a linear and parallel diffracted beam and the post-hologram formed with two waves, i.e., the plane wave and the divergent wave.

The hologram rotator provides a hologram having a single spatial frequency of 1860 lines/mm. The hologram is formed by using an Ar laser with a wavelength of 488 nm, setting the waves at an incident angle of 27°, and causing interference between the two plane waves. When the light beam of the semiconductor laser has the wavelength of 760 nm at an incident angle of 45° to the hologram rotator, the parallel beam is diffracted and straight-line scanned. Then the scanning position x, being distant from the hologram rotator (disk 1) by L, is given approximately by the following equation as a function of the rotation angle θ of the hologram disk 1.

$$x = 2L\sin\theta / \sqrt{4\cos\theta - 3} \quad (10)$$

The deviation $\beta(\%)$ from complete linear scanning is given as the equation (11).

$$\beta = 100(x - 2L\theta)/2L\theta = 100(\sin\theta / \sqrt{4\cos\theta - 3} - \theta)/\theta \quad (11)$$

In the equation, if $\theta = 10°$, $\beta$ becomes 2.7%. The improvement of the image focusing characteristic of the parallel light beam and the linear scanning characteristic is realized by the provision of the post-hologram formed with the plane wave and divergent wave and the arrangement of the reconstruction optical system.

Figure 18:
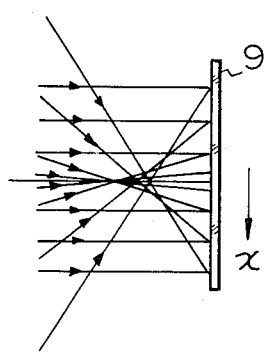
FIG. 18 is a top view showing light waves for forming the post-holograms shown in FIG. 17.
Figure 19:
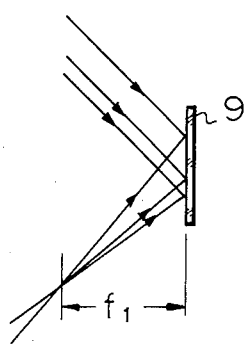
FIG. 19 is a side view showing light waves for forming the post-holograms shown in FIG. 17.
Figure 20:
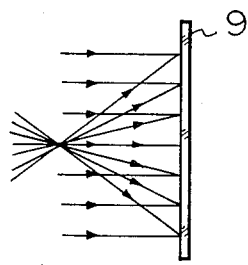
FIG. 20 is a top view showing light waves, as an example using waves having no aberration, similar to those shown in FIG. 18.

The wavefront for forming the post-hologram is preferably that as shown in the top view of FIG. 18 and the side view in FIG. 19. Namely, in the top view the wavefront is a divergent wave having a spherical aberration and, at the side view, the wave front is a spherical wave. By providing the aberration, improvement of the linear scanning characteristic and the image focusing characteristic is attained, when compared with that with no aberration, as shown in FIG. 20.

In the above-mentioned hologram, the spatial frequencies $f_x(x)$ and $f_y(y)$ are generally given by the following equations (12) and (13), where $\lambda_2$ is a reconstruction wavelength. $S_x$, $S_y$ and $S'_x$, $S'_y$ are constant numbers as known in the art. $S'_x$ is a coefficient used as a factor with respect to the focus distance f, for the spatial frequency $f_x(x)$ in the x direction, and $S'_y$ is a coefficient used as a factor with respect to the focus distance f, for the spatial frequency $f_y(y)$ in the y direction.

$$\lambda_2 f_x(x) = \frac{Sx}{\sqrt{S'^2_x f^2 + x^2}} \quad (12)$$

$$\lambda_2 f_y(y) = \frac{Sy}{\sqrt{S'^2_y f^2 + y^2}} \quad (13)$$

Figure 21:
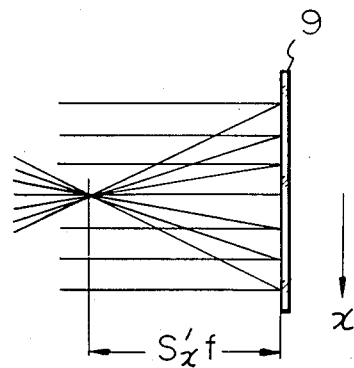
FIG. 21 is a top view showing light waves for forming the post-holograms shown in FIG. 17.
Figure 22:
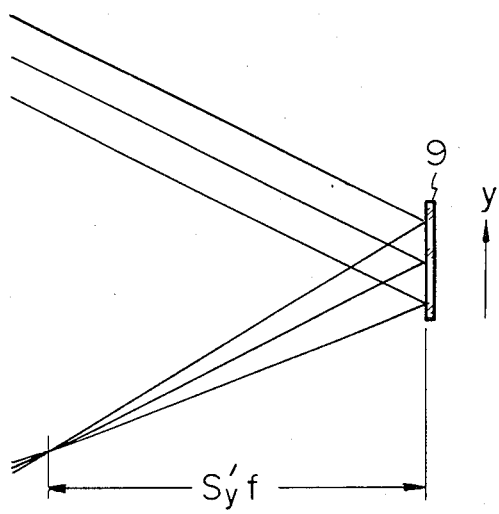
FIG. 22 is a side view showing light waves for forming the post-holograms shown in FIG. 17.
Figure 23:
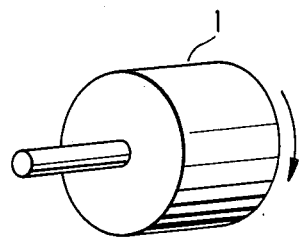
FIG. 23 is a hologram rotator having a cylindrical shape.
Figure 24:
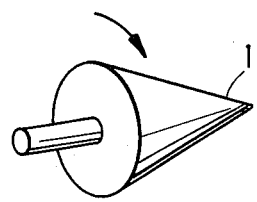
FIG. 24 is a hologram rotator having a conical shape.

In the following, the forming procedure of the post-hologram 9 is shown as a concrete example. If the forming wavelength of 488 nm is from an Ar laser and reconstructing is made by the laser diode having the wavelength of 760 nm, the S in the equations (12) and (13) is 1.557. As shown in FIGS. 21 and 22, as one wavefront, the divergent wave having astigmatism in the x direction focal length of $S'_x f = 467.2$ mm ($S'_x = 1.557$), and in the y direction focal length of $S'_y f = 936.2$ mm ($S'_y = 3.120$), is used. The other wave front is a plane wave at incident angle 27°. As a result, the hologram for which respective terms in equations (12) and (13) can have the values $S = 1.557$, $f = 300$ mm, $S'_x = 1.557$, and $S'_y = 3.120$ is obtained, and the hologram includes information regarding the linear scanning characteristics and image focusing characteristics.

If the distance between the post-hologram and the hologram disk is 300 mm, a high quality focusing beam is projected on a position at a distance of 300 mm from the post-hologram. The deviation from truly linear scanning is $-0.7\%$ at $\theta = 10°$ When the change of the wavelength due to the mode hopping of the semiconductor laser is 0.3 nm, the deviation of the scanning position is 470 μm without the post-hologram; however, by providing the post-hologram, the deviation is reduced to less than 5 μm.

Although in the above-mentioned embodiments the explanations are given on the basis of using a circular disk hologram, a circular cone or a cylinder may be applied instead of the disk with the same results.

We claim:

1. A light beam scanning apparatus comprising:
a hologram rotator having fringes for diffracting an incident light beam, which is incident on said hologram rotator, having a component of tilt in a first direction from the normal of said hologram rotator, to provide a diffracted light beam exiting said hologram rotator in a direction having a component of tilt substantially opposite said first direction with respect to said normal;
said post-hologram having fringes, for further diffracting said diffracted light beam in a direction substantially opposite to the direction of said diffracted light beam exiting said hologram rotator, said fringes being such that the light beam from said hologram rotator converges after passing through said post hologram; and
a scanning surface on which said converging light projected from said post-hologram scans in focus.

2. An apparatus as set forth in claim 1, wherein the hologram of the hologram rotator is a circularly shaped disk.

3. An apparatus as set forth in claim 1, wherein the hologram rotator has a cylindrical shape.

4. An apparatus as set forth in claim 1, wherein the hologram rotator has a circular conical shape.

5. An apparatus as set forth in claim 1, wherein the hologram of the hologram rotator is formed using two wavefronts that are both plane waves.

6. An apparatus as set forth in claim 1, wherein the hologram of the hologram rotator is formed using two wavefronts that are a plane wave and a divergent wave.

7. An apparatus as set forth in claim 1, wherein the hologram of the hologram rotator is formed using two wavefronts that are both divergent waves.

8. An apparatus as set forth in claim 1, wherein said post-hologram has fringes for providing a linear scanning characteristic for scanning the light beam diffracted by said post-hologram.

9. An apparatus as set forth in claim 1 wherein the post-hologram is formed using two wavefronts that are both divergent waves.

10. An apparatus as set forth in claim 1, wherein the fringes of said post-hologram are provided as a result of using two wavefronts including a convergent wave and a divergent wave.

11. An apparatus as set forth in claim 1, wherein the fringes of said post-hologram are provided as a result of two wavefronts including a plane wave and a divergent wave.

12. The apparatus of claim 1, wherein said post-hologram is formed with two waves at least one of which is a nearly spherical wave containing spherical aberration.

* * * * *

UNITED STATES PATENT AND TRADEMARK OFFICE
CERTIFICATE OF CORRECTION

PATENT NO. : 4,810,046
DATED : MARCH 7, 1989
INVENTOR(S) : FUMIO YAMAGISHI ET AL.

It is certified that error appears in the above-identified patent and that said Letters Patent is hereby corrected as shown below:

Col. 3, line 17, "waelength" should be --wavelength--;
        line 68, "$\theta$." should be --$\theta_i$.--.

Col. 4, line 24, "linealy" should be --linearly--.

Col. 5, line 35, "a," should be --A,--.

Col. 6, line 51, haing" should be --having--.

Signed and Sealed this

Eighth Day of August, 1989

Attest:

DONALD J. QUIGG

Attesting Officer

Commissioner of Patents and Trademarks